(12) United States Patent
Allen

(10) Patent No.: US 9,678,282 B2
(45) Date of Patent: Jun. 13, 2017

(54) FIBER OPTIC ADAPTERS AND CONNECTOR DEVICES WITH MOUNTING FEATURES AND MOUNTING SYSTEMS AND METHODS INCLUDING SAME

(71) Applicant: Tyco Electronics Corporation, Berwyn, PA (US)

(72) Inventor: Barry Wayne Allen, Siler City, NC (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 76 days.

(21) Appl. No.: 14/476,942

(22) Filed: Sep. 4, 2014

(65) Prior Publication Data

US 2014/0369649 A1 Dec. 18, 2014

Related U.S. Application Data

(63) Continuation of application No. 13/420,276, filed on Mar. 14, 2012, now Pat. No. 8,827,571.

(Continued)

(51) Int. Cl.
*G02B 6/38* (2006.01)

(52) U.S. Cl.
CPC ......... *G02B 6/3807* (2013.01); *G02B 6/3825* (2013.01); *G02B 6/3897* (2013.01);
(Continued)

(58) Field of Classification Search
CPC .. G02B 6/3807; G02B 6/3825; G02B 6/3897; G02B 6/3894; Y10T 29/4981; Y10T 29/49826
(Continued)

(56) References Cited

U.S. PATENT DOCUMENTS 4,699,460 A * 10/1987 Szentesi ............... G02B 6/3823
385/134
5,661,840 A 8/1997 Caveney
(Continued)

FOREIGN PATENT DOCUMENTS

| EP | 0 785 450 A1 | 7/1997 |
| JP | 11-271569 | 10/1999 |
| WO | 2012/110876 | 8/2012 |

OTHER PUBLICATIONS

Notification of Transmittal of the International Search Report and Written Opinion of the International Searching Authority, or the Declaration in corresponding PCT Application No. PCT/US2012/029008 mailed May 29, 2012 (11 pages).

(Continued)

*Primary Examiner* — Jerry Blevins
(74) *Attorney, Agent, or Firm* — Merchant & Gould P.C.

(57) ABSTRACT

A fiber optic adapter system includes a fiber optic adapter and a mounting bracket. The fiber optic adapter includes a first interlock feature. The mounting bracket defines a channel having a longitudinal channel axis and a longitudinally extending lateral side opening. The mounting bracket includes a second interlock feature. The fiber optic adapter and the mounting bracket are relatively configured to enable a user to interlock the first and second interlock features to secure the fiber optic adapter to the mounting bracket by inserting the fiber optic adapter into the channel through the lateral side opening in an insertion direction transverse to the channel axis.

21 Claims, 9 Drawing Sheets

Related U.S. Application Data

(60) Provisional application No. 61/470,811, filed on Apr. 1, 2011.

(52) U.S. Cl.
CPC ......... *G02B 6/3894* (2013.01); *Y10T 29/4981* (2015.01); *Y10T 29/49826* (2015.01)

(58) Field of Classification Search
USPC .......................................... 385/75, 134, 136
See application file for complete search history.

(56) References Cited

U.S. PATENT DOCUMENTS

| | | | | |
|---|---|---|---|---|
| 6,640,041 | B2* | 10/2003 | Ichinari et al. | 385/136 |
| 6,782,618 | B2* | 8/2004 | Luzzi | H02G 1/14 29/748 |
| 2004/0072454 | A1* | 4/2004 | Nakajima et al. | 439/79 |
| 2006/0093275 | A1 | 5/2006 | Lagace et al. | |
| 2009/0269011 | A1* | 10/2009 | Scadden et al. | 385/65 |
| 2009/0310916 | A1* | 12/2009 | Luther et al. | 385/60 |
| 2010/0034502 | A1* | 2/2010 | Lu et al. | 385/60 |

OTHER PUBLICATIONS

Notification Concerning Transmittal of International Preliminary Report on Patentability issued in corresponding PCT Application No. PCT/US2012/029008, mailed Oct. 10, 2013 (8 pages).

* cited by examiner

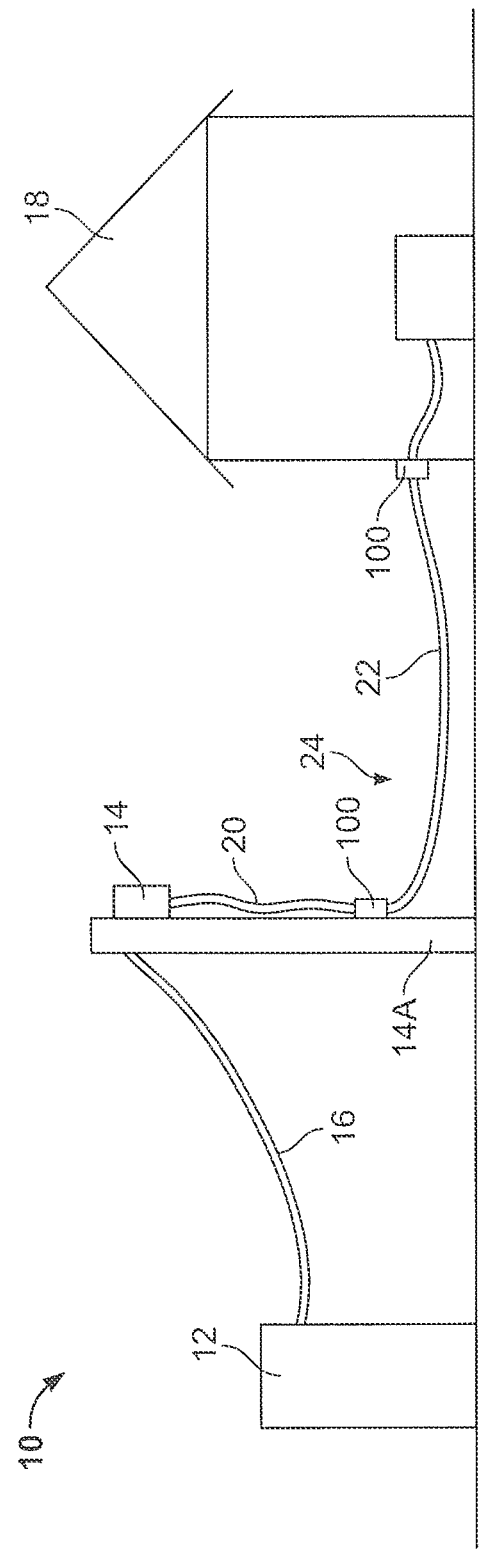

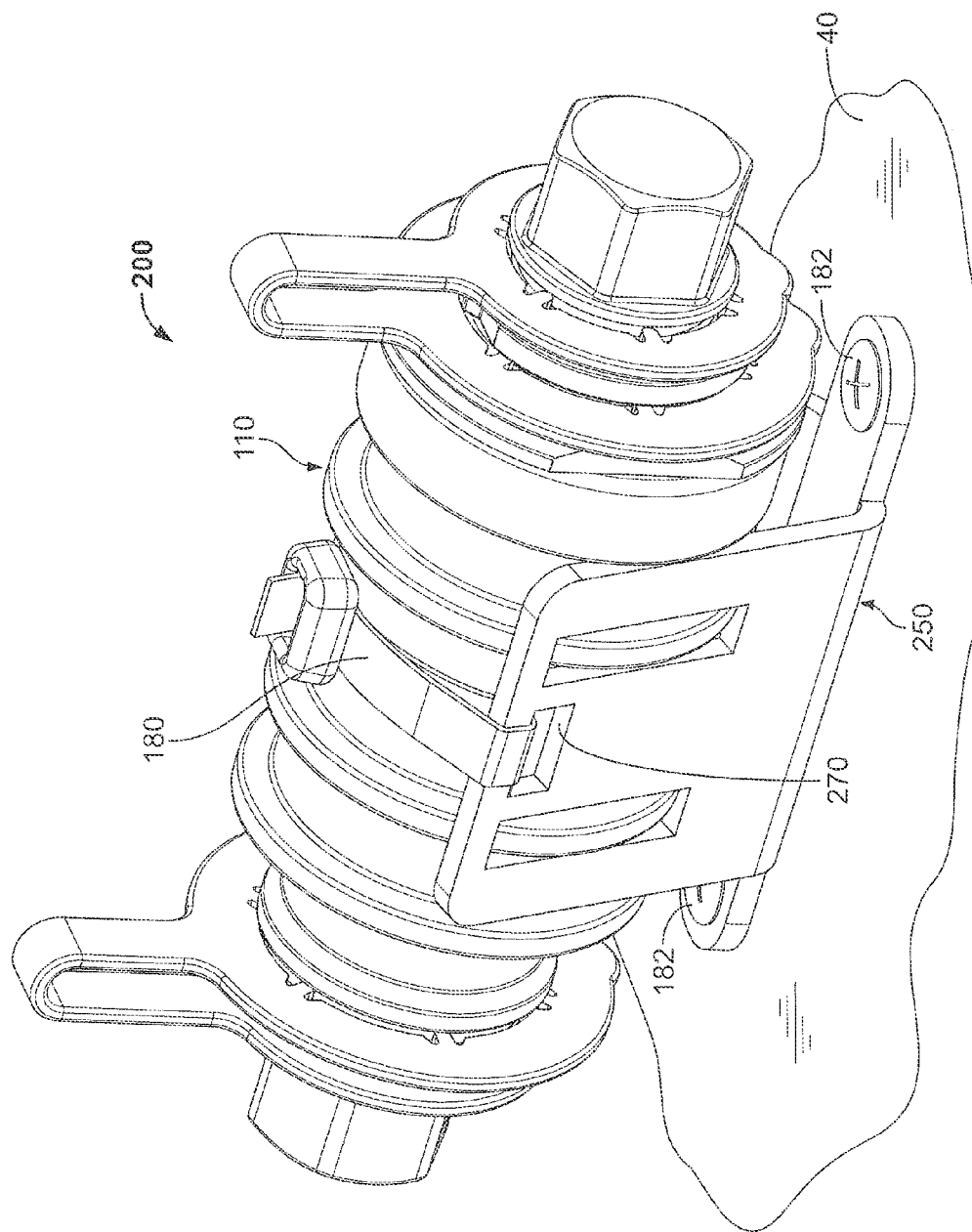

FIBER OPTIC ADAPTERS AND CONNECTOR DEVICES WITH MOUNTING FEATURES AND MOUNTING SYSTEMS AND METHODS INCLUDING SAME

CROSS REFERENCE TO RELATED APPLICATIONS

This application is a continuation of application Ser. No. 13/420,276, filed Mar. 14, 2012, now U.S. Pat. No. 8,827,571, which application claims the benefit of provisional application Ser. No. 61/470,811, filed Apr. 1, 2011, which applications are incorporated herein by reference in their entirety.

FIELD OF THE INVENTION

The present invention relates to optical fiber communications and, more particularly, to fiber optic connector devices, such as fiber optic adapters, and methods for mounting the same.

BACKGROUND

Optical fiber networks are increasingly being installed to support high speed voice and data communications. Increasingly, the optical fiber network is being expanded out from the central office of the communication service provider companies, such as Regional Bell Operating Companies (RBOCs), to the subscriber locations, such as homes or businesses, where conventional copper wiring was conventionally used. In various locations in a fiber optic network, fiber optic cables must be operatively connected. In some cases, fiber optic adapters (e.g., male-to-male or female-to-female) connectors are employed.

SUMMARY

According to embodiments of the present invention, a fiber optic adapter system includes a fiber optic adapter and a mounting bracket. The fiber optic adapter includes a first interlock feature. The mounting bracket defines a channel having a longitudinal channel axis and a longitudinally extending lateral side opening. The mounting bracket includes a second interlock feature. The fiber optic adapter and the mounting bracket are relatively configured to enable a user to interlock the first and second interlock features to secure the fiber optic adapter to the mounting bracket by inserting the fiber optic adapter into the channel through the lateral side opening in an insertion direction transverse to the channel axis.

According to method embodiments of the present invention, a method for mounting a fiber optic adapter includes providing a fiber optic adapter system including: a fiber optic adapter including a first interlock feature; and a mounting bracket defining a channel having a longitudinal channel axis and a longitudinally extending lateral side opening, the mounting bracket including a second interlock feature. The method further includes inserting the fiber optic adapter into the channel through the lateral side opening in an insertion direction transverse to the channel axis to thereby interlock the first and second interlock features to secure the fiber optic adapter to the mounting bracket.

According to embodiments of the present invention, a fiber optic adapter includes a housing including at least one groove configured to receive a retainer member to secure the fiber optic adapter to a mount.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 8 is a schematic view of a fiber optic network including the fiber optic adapter system of FIG. 1.

FIG. 9 is a perspective view of a fiber optic adapter system according to further embodiments of the invention.

DETAILED DESCRIPTION

Figure 1:
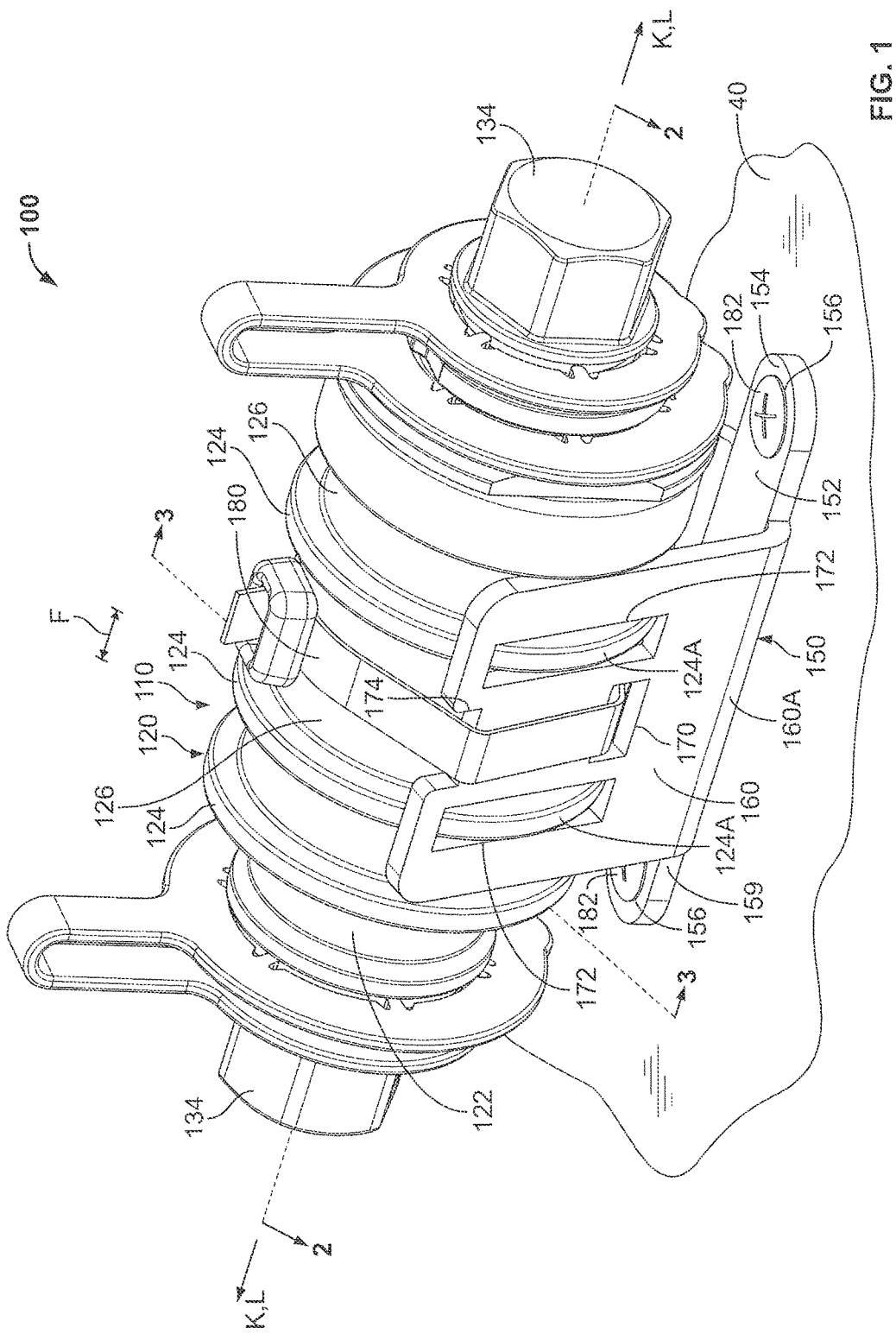
FIG. 1 is a perspective view of a fiber optic adapter system according to embodiments of the present invention on a mount surface.

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense expressly so defined herein.

With reference to FIGS. 1-7, a fiber optic adapter system 100 according to some embodiments of the present invention will now be described. The adapter system 100 includes an adapter 110, a mounting bracket 150, a retainer member 180, and one or more fasteners 182. According to some embodiments and as shown, the adapter 100 is a ruggedized fiber optic adapter.

Figure 7:
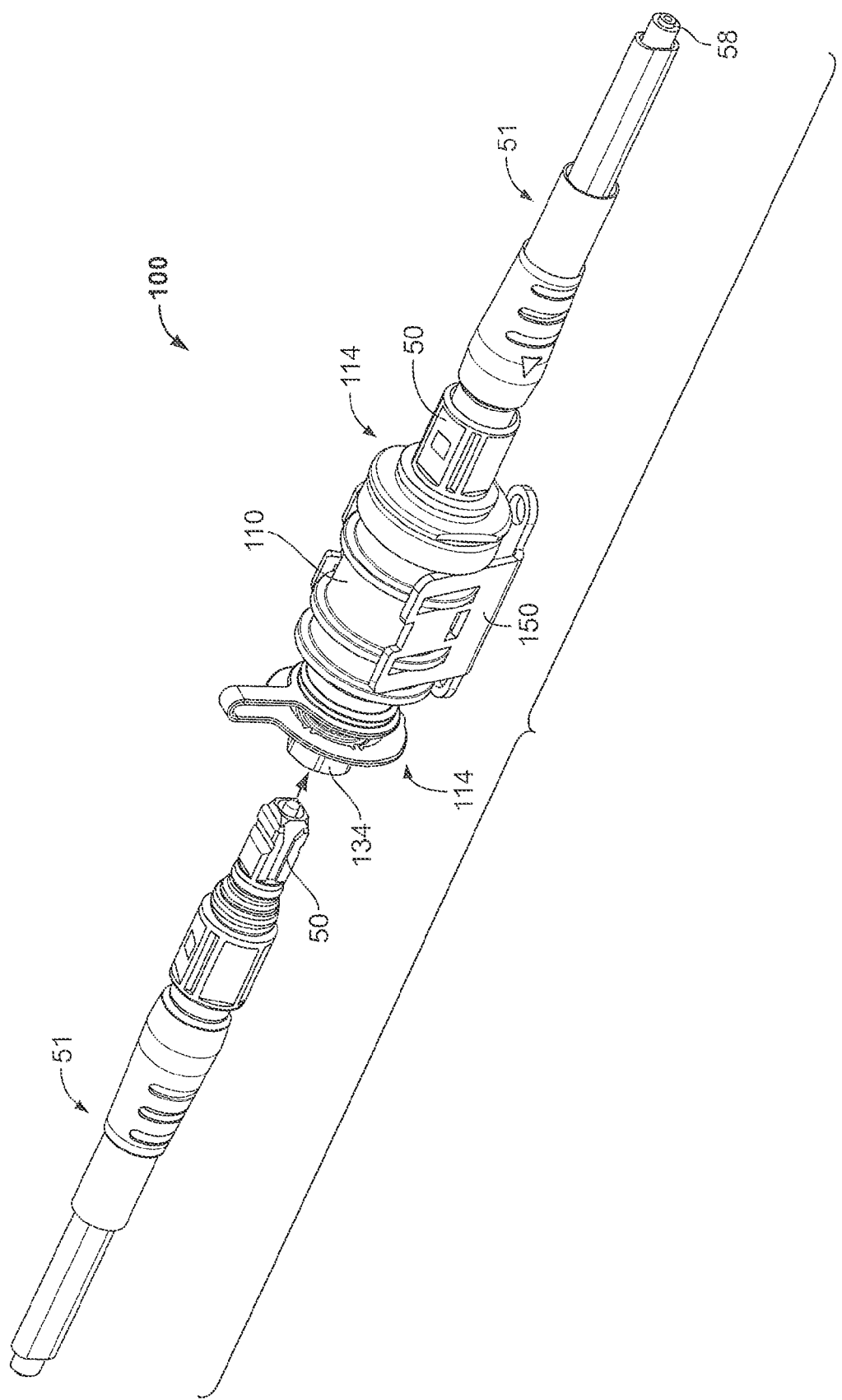
FIG. 7 is a perspective view of the fiber optic adapter system of FIG. 1 and a pair of connectorized optical fibers.

With reference to FIG. 7, the adapter system 100 may be used to interconnect two fiber optic connectors 50. The fiber optic connectors 50 may be, for example, FC-type, SC-type, ST-type, LC-type, MPO connectors or other industry standard connectors terminating optical fibers 58 to form a connectorized optical fiber (also referred to as a pigtail) 51. The optical fiber 58 includes a waveguide (typically formed of glass). The waveguide may be protected by a resin and/or jacket, for example, outside of the connector 50. Suitable connectors may include, for example, DLX™ connectors available from ADC Telecommunications or OptiTap™ connectors available from Corning Incorporated. As shown, the connector 50 is based on an SC-type footprint fiber optic connector. One or more of the adapter systems 100 can be incorporated into a fiber optic network, such as the exemplary fiber optic network 10 shown in FIG. 8 and described in more detail hereinbelow.

Figure 2:
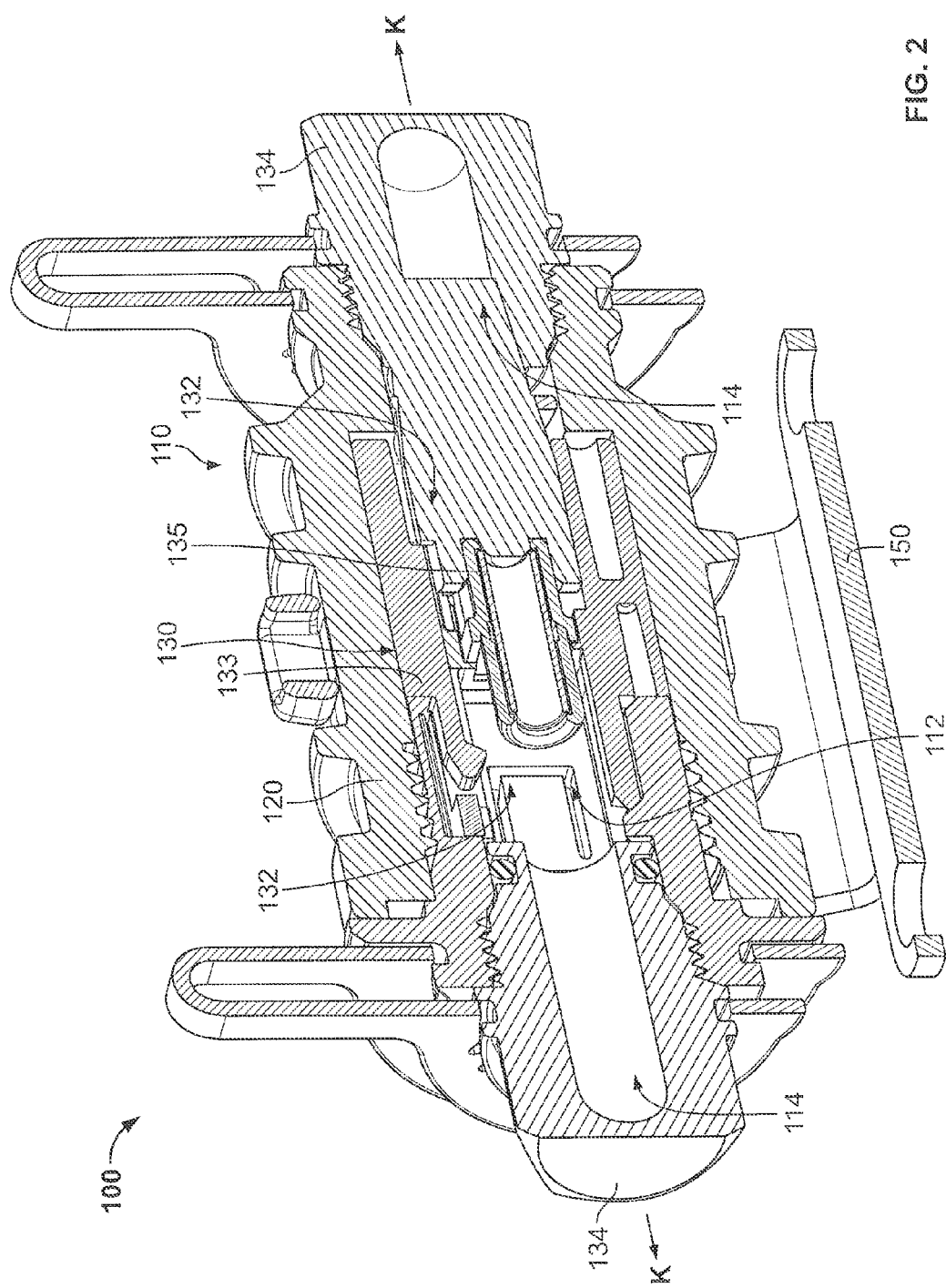
FIG. 2 is a cross-sectional view of the fiber optic adapter system of FIG. 1 taken along the line 2-2 of FIG. 1.

With reference to FIG. 2, the adapter 110 includes a housing 120, a fiber optic adapter device 130, and a pair of protective end caps 134. The adapter housing 120 has a longitudinal axis K-K and defines a chamber 112 and opposed end ports 114. The fiber optic adapter device 130 includes a body 133 defining opposed sockets 132 configured to receive and secure the fiber optic connectors 50, and an alignment sleeve 135 located between the sockets 132. The fiber optic adapter device 130 is mounted in the chamber 112 between the caps 134. The adapter 110 is configured to receive the fiber optic connectors 50 through the ports 114 and seat the connectors 50 in the sockets 132 to make an optical connection therebetween. The fiber optic adapter device 130 and the internal configuration and components of the adapter 110 may be of any suitable type and construction. For example, the fiber optic adapter device 130 may be of a type discussed above with regard to the fiber optic connectors 50.

With reference to FIGS. 1, 2 and 4A-4C, the adapter housing 120 has an outer surface 122. According to some embodiments, the outer surface 122 is generally cylindrical, the axis of the cylinder being generally coincident with the axis K-K. Integral locater features in the form of annular, circumferential ribs 124 extend radially outwardly from the surface 122. The ribs 124 are spaced apart from one another along the axis K-K to define annular, circumferential grooves 126.

The housing 120 may be formed of any suitable material(s). According to some embodiments, the housing 120 is formed of a polymer.

With reference to FIGS. 1, 2 and 5A-5C, the mounting bracket 150 includes a base 152, integral, laterally opposed side walls 160 and 162, and integral, axially opposed mounting tabs 154.

Mounting holes 156 are defined in the mounting tabs 154 to receive the fasteners 182 to secure the bracket 150 to a selected substrate. However, according to some embodiments, other types or configurations of bracket mounting features may be provided in place of or in addition to the tabs 154 and holes 156.

The side walls 160 and 162 may be generally planar. The side walls 160 and 162 are joined to the base 152 by bends 160A and 162A, respectively, to each form an included angle A (FIG. 5A) with respect to the base 152. According to some embodiments, the angle A is in the range from about 95 to 120 degrees and, according to some embodiments, in the range of from about 105 to 109 degrees. According to some embodiments and as illustrated, the angles A of the two side walls 160, 162 are the same; however, the side wall angles may be different. According to some embodiments, the included angle B (FIG. 5A) between the side walls 160, 162 is in the range of from about 10 to 60 degrees and, according to some embodiments, in the range of from about 30 to 38 degrees.

Retainer member slots 170 and interlock slots 172 are defined in and extend radially through each side wall 160, 162. The interlock slots 172 may each take the form of elongate openings or holes as illustrated, wherein each interlock slot 172 is closed at least at its upper end. Similarly, the retainer member slots 170 may each take the form of a closed opening or hole, as illustrated. An open ended retainer member recess 174 is defined in the free edge 160B, 162B of each side wall 160, 162.

Figure 6:
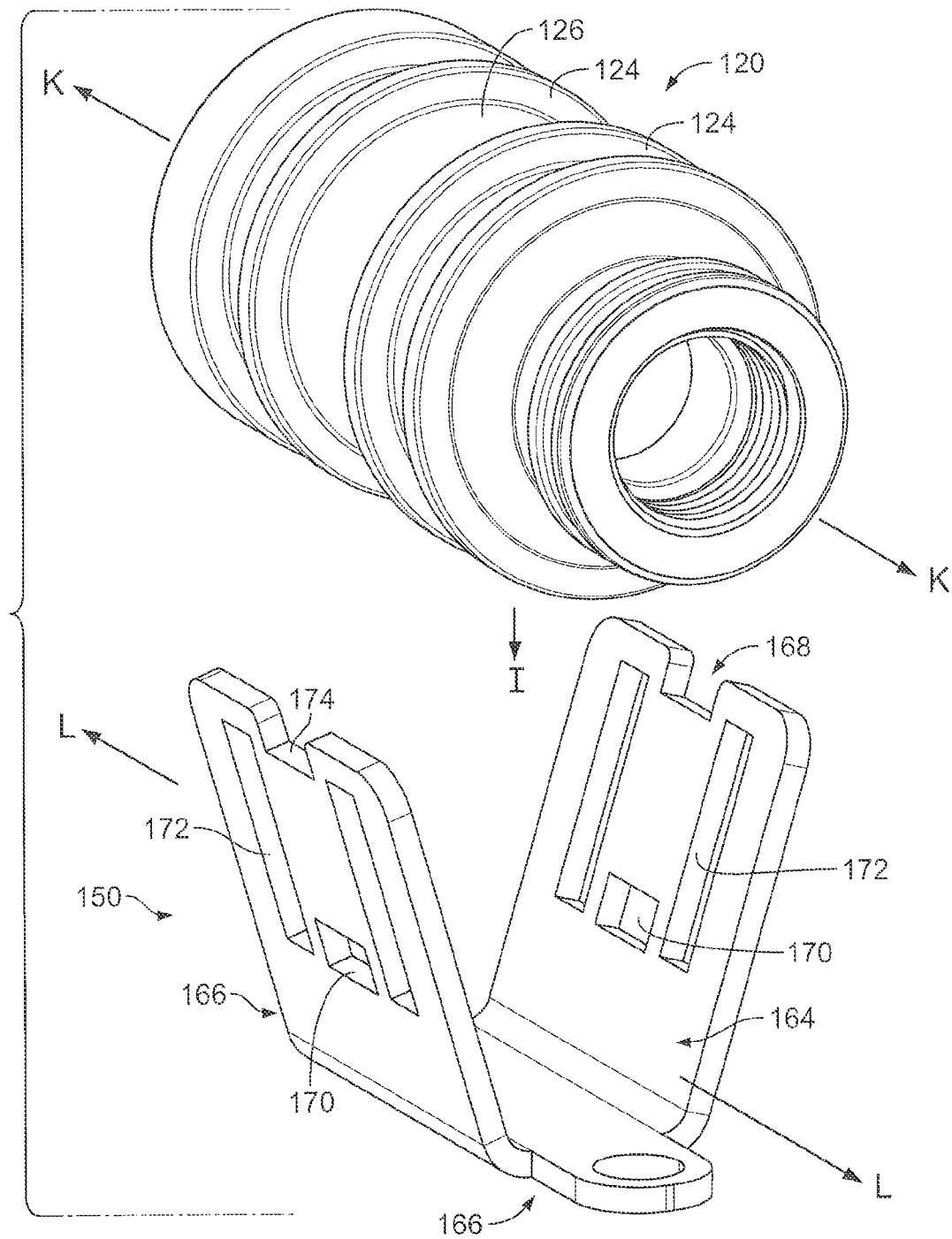
FIG. 6 is an exploded, perspective view of the fiber optic adapter system of FIG. 1.

With reference to FIG. 6, the base 152 and the side walls 160, 162 define a longitudinally extending channel 154 having a channel axis L-L. The channel 154 has opposed end openings 166 spaced apart along the channel axis L-L and a lateral side opening 168 extending longitudinally and generally parallel to the channel axis L-L.

The bracket 150 may be formed of any suitable material. According to some embodiments, the bracket 150 is formed of a resilient metal such as spring steel. According to some embodiments, the bracket 150 is formed of a resilient polymeric material. The bracket 150 may be integrally molded or stamped.

The retainer member 180 may be any suitable device operable to secure the adapter 110 to the bracket 150 as described herein. According to some embodiments, the retainer member 180 is an elongate member. According to some embodiments, the retainer member 180 is a flexible band and, in some embodiments, an endless flexible band. According to some embodiments and as illustrated, the retainer member 180 is a tie wrap.

According to some embodiments, the width E (FIG. 4B) of the center groove 126 is greater than the width F (FIG. 1) of the retainer member 180. According to some embodiments, the height Q (FIG. 4C) of the ribs 124 is in the range of from about 0.03 to 0.125 inch.

The adapter system 100 may be used as follows in accordance with methods of the invention.

The end caps 134 are removed from the housing 120. The fiber optic connectors are inserted into the sockets 133 of the fiber optic adapter device 130 through the ports 114 to form a fiber optic connection.

The bracket 150 is affixed to a selected substrate or mount surface 40 using fasteners 182 inserted through the holes 156. The adapter 110 is oriented generally in parallel with the channel axis L-L and forced in a lateral insertion direction I (FIG. 3; along an insertion axis M-M transverse to the channel axis L-L) into the channel 164 (i.e., toward the base 152). The outer diameter G (FIG. 4C) of the ribs 124 is greater than the spacing distance between the side walls 160, 162 up to the tops of the interlock slots 172. As a result, the forced insertion of the adapter 110 into the channel 154 causes the sidewalls 160, 162 to deflect radially outwardly in divergent directions D (as shown in dashed lines in FIG. 3) along a deflection axis N-N transverse to the channel axis L-L about the bends 160A, 162A. The user continues to force the adapter 110 into the channel 154 until portions 124A of the ribs 124 seat in the interlock slots 172, which permits the side walls 160, 162 to convergently return partially or fully to their relaxed positions (i.e., the adapter 110 "snaps" into the bracket 150).

According to some embodiments, the maximum deflection distance P (FIG. 3) is in the range from about 0.03 to 0.125 inch and, according to some embodiments, from about 0.05 to 0.08 inch. According to some embodiments, the required insertion force to install the adapter 110 in the bracket 150 is in the range from about 0.5 to 10 pounds.

The ribs 124 and the interlock slots 172 serve as first and second cooperating interlock features, respectively. Captured portions 124A (FIG. 1) of the ribs 124 are interlocked with the interlock slots 172 of the bracket 150. This interlock can prevent or inhibit lateral and/or axial displacement of the adapter 110 with respect to the bracket 150 to thereby secure the adapter 110 to the mounting surface 40.

Before or after inserting the adapter 110 into the bracket 150, the user can route the retainer member 180 through the slots 170. The retainer member 180 can then be wrapped around the adapter 110 as shown in FIG. 1 and tightened or cinched to secure the adapter 110 to the bracket 150. The retainer member 180 extends through the recesses 174 to positively locate the retainer member 180 and permit greater loading on the adapter 100.

With reference to FIG. 8, an exemplary fiber optic network 10 according to embodiments of the present invention is shown therein including two adapter systems 100. The network 10 includes a fiber optic cable (or cables) 16 extending from a central office 12 to an outside plant terminal 14. The terminal 14 may be, for example, a cabinet mounted on a utility pole 14A. The terminal 14 is intended to provide fiber to the home (FTTH) or fiber to the business (FTTB) service to a structure 18 (e.g., a business or single or multi-dwelling structure). In order to provide a jumper cable 24 of sufficient length between the terminal 14 and the structure 18, it may be necessary or desirable to connect a first length of fiber optic cable 20 with a second length of fiber optic cable 22 using the fiber adapter 110. The mounting bracket 150 can be affixed to the utility pole 14A, or in a cabinet or on another suitable substrate. The adapter 110 can then be mounted on the bracket 150 as discussed herein.

In another application in the network 10, the adapter system 100 can be used to connect the fiber optic cable 22 from the outside plant to on-premises optical fiber 26 at the premises or on the structure 18. For example, the adapter 110 can be mounted at a location accessible to a technician from outside the structure 18 and may serve as a demarcation point between the outside plant fiber and the on-premises/customer fiber 26 (e.g., to customer equipment 30). The adapter system 110 can be mounted at this location (e.g., on an exterior wall of the structure 18) in the same manner as described above. Advantageously, this arrangement permits a technician to disconnect the jumper cable 24 from the premises and modify or repair the outside cabling without disturbing the fiber within the structure 18.

Figure 3:
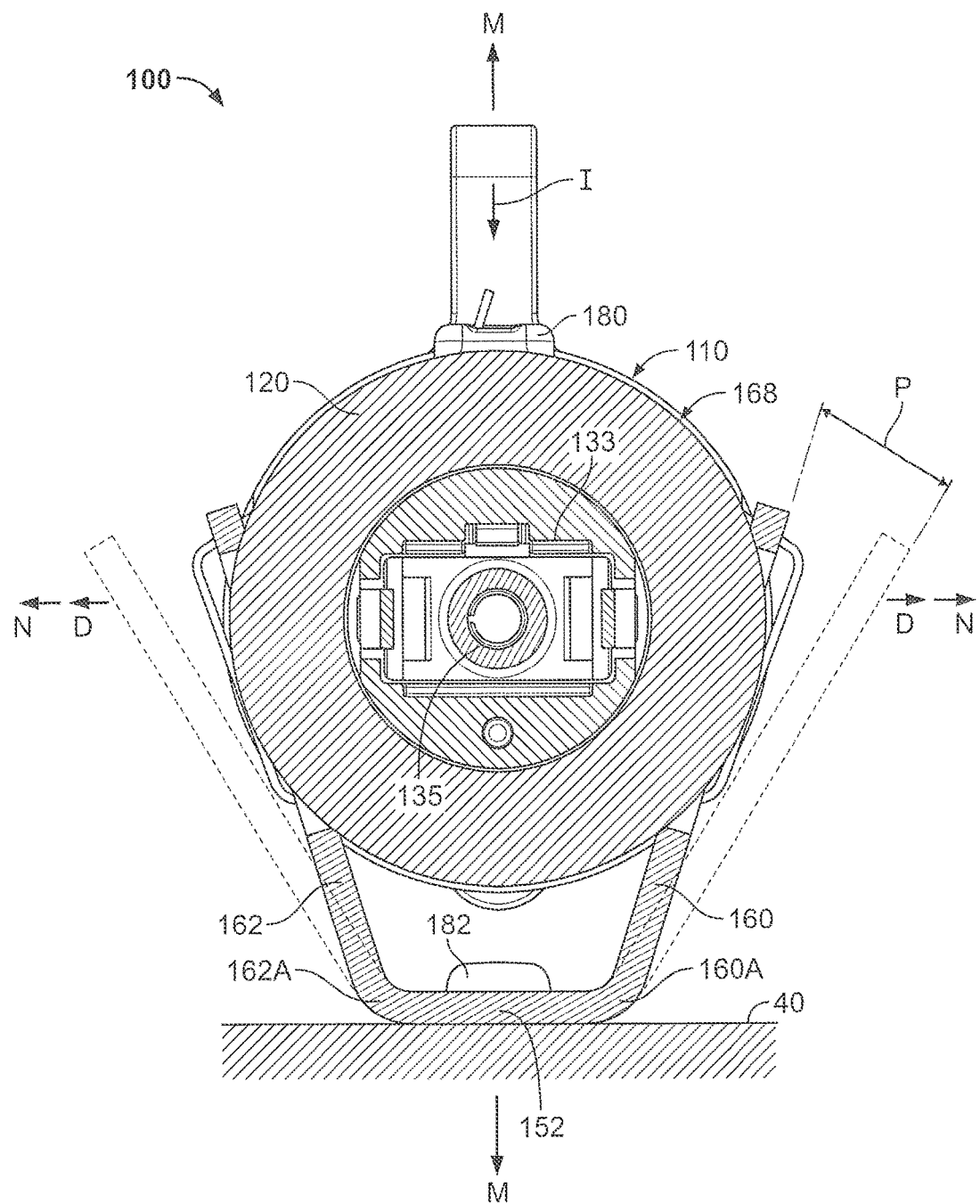
FIG. 3 is a cross-sectional view of the fiber optic adapter system of FIG. 1 taken along the line 3-3 of FIG. 1.
Figure 4A:
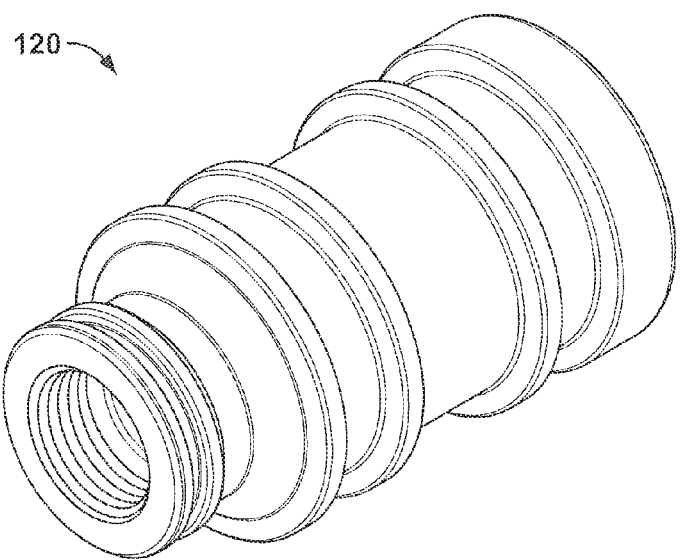
FIG. 4A is a perspective view of an adapter housing forming a part of the fiber optic adapter system of FIG. 1.
Figure 4B:
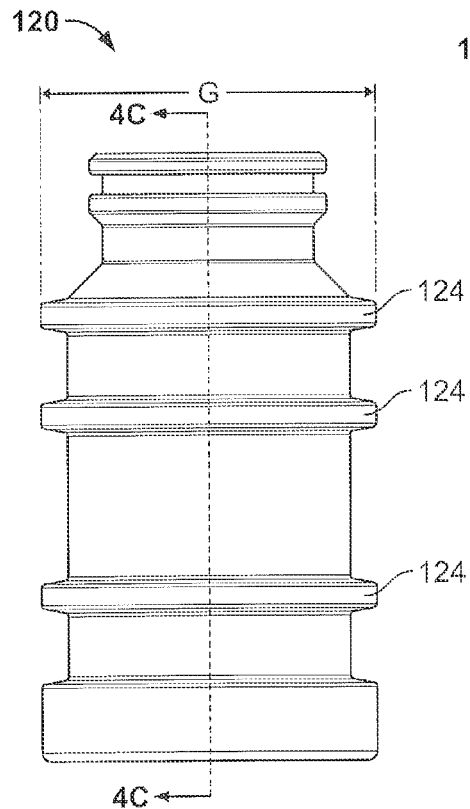
FIG. 4B is a top view of the adapter housing of FIG. 4A.
Figure 4C:
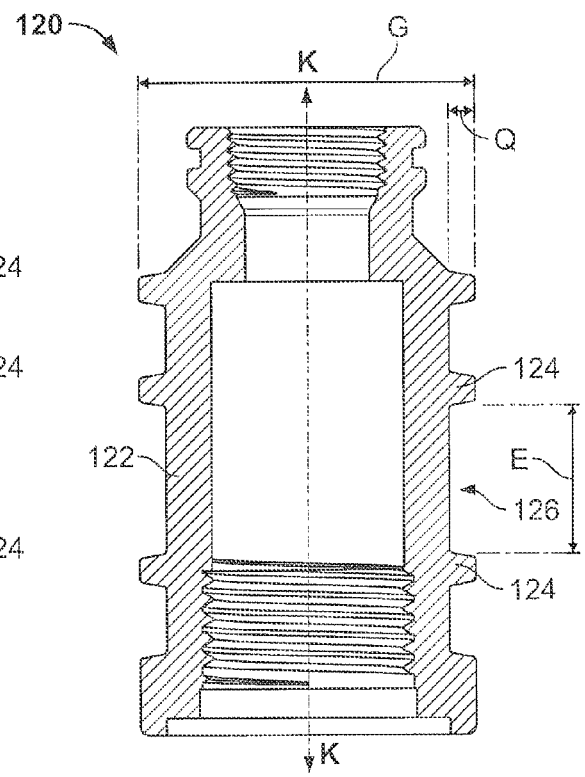
FIG. 4C is a cross-sectional view of the adapter housing of FIG. 4A taken along the line 4C-4C of FIG. 4B.
Figure 5A:
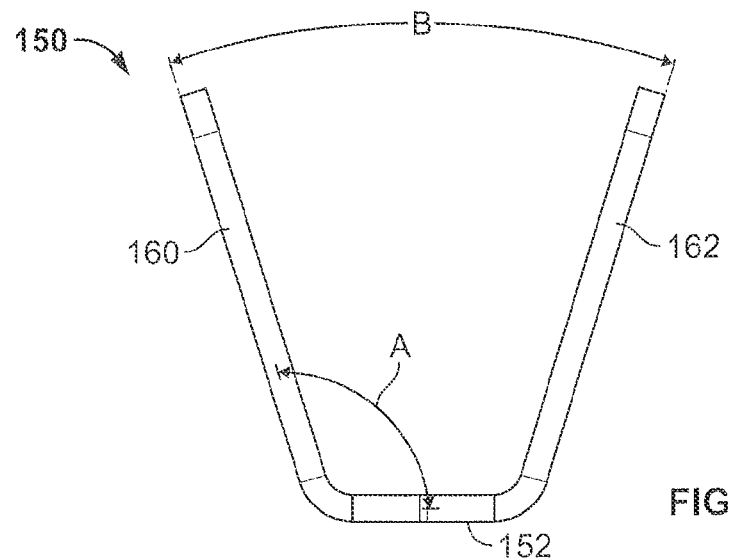
FIG. 5A is an end view of a mounting bracket forming a part of the fiber optic adapter system of FIG. 1.
Figure 5B:
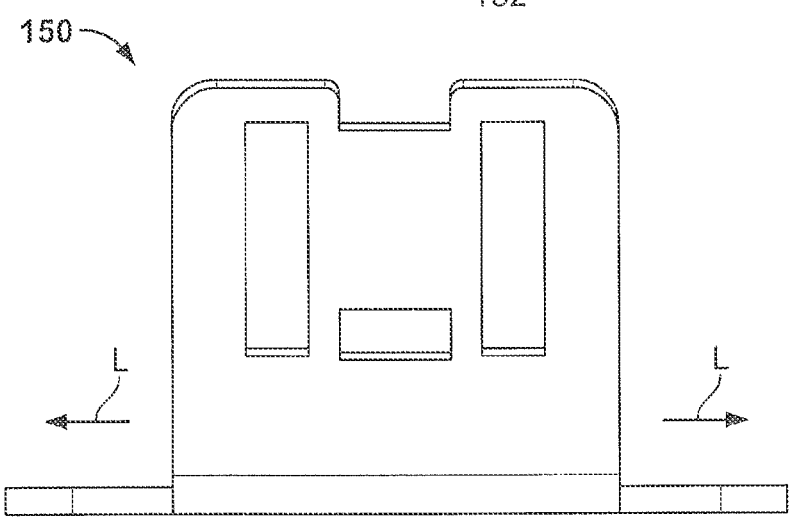
FIG. 5B is a side view of the mounting bracket of FIG. 5A.
Figure 5C:
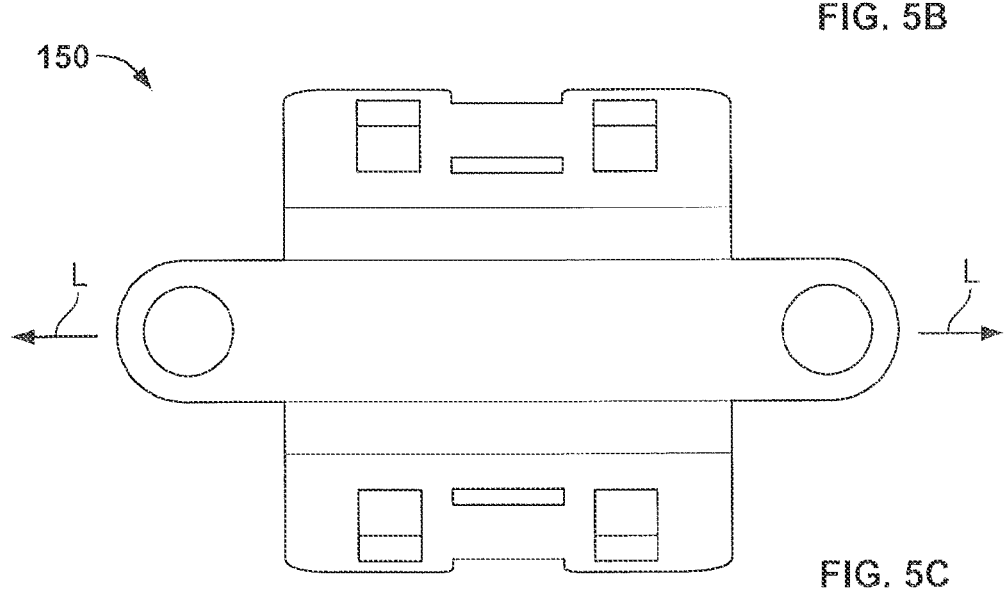
FIG. 5C is a top view of the mounting bracket of FIG. 5A.

According to some embodiments and as illustrated in FIGS. 1-3, the adapter 110 is a ruggedized (i.e., environmentally sealed or protected) outside plant adapter for co-terminating or mating two ruggedized preterminated fiber optic cables. According to other embodiments, the adapter can be a non-ruggedized adapter or another type of fiber optic connector, such as an optical fiber termination connector.

According to further embodiments, the first and second mounting features and bracket as described herein may be employed with a fiber optic connecter other than a fiber optic adapter.

According to further embodiments, the first and second interlocking features (e.g., the ribs and interlock slots) can be employed without use of a supplemental retainer member such as a tie wrap.

Adapters according to embodiments of the present invention may further include an anti-rotation feature such as a detent or notch in the ribs 124 to prevent or limit rotation of the adapter 100 about the axis K-K when the adapter 100 is mounted in the bracket 150. According to some embodiments, the adapter housing 120 can be provided with a feature or shape (e.g., a flat or bump) that positively rotationally orients the adapter 100 (about the axis K-K) with respect to the bracket 150.

FIG. 9 illustrates an adapter system 200 according to further embodiments of the invention. The adapter system 200 includes an adapter 210 corresponding to the adapter 110, a retainer member 280 corresponding to the retainer member 180, and a mounting bracket 250 corresponding to the bracket 150. The adapter system 200 differs from the adapter system 100 in that the retainer member slots 270 of the bracket 250 (the opposing slot 270 is not visible in FIG. 9) are located proximate the top edges of the side walls and no retainer member recess is provided. The retainer member 280 may be routed differently between the bracket 250 and the adapter 210 than the retainer member 180, as shown.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An optical adapter for optically coupling first and second ruggedized optical connectors, the optical adapter comprising:
   an adapter body defining a channel extending along a longitudinal axis that extends between first and second oppositely facing ports, the first port defining a first attachment structure to receive the first ruggedized optical connector so that the first ruggedized optical connector is environmentally sealed to the optical adapter and the second port defining a second attachment structure to receive the second ruggedized optical connector so that the second ruggedized optical connector is environmentally sealed to the optical adapter;

internal structure disposed within the adapter body and configured to align the first and second ruggedized optical connectors; and first and second end caps configured to be removably disposed in the first and second ports, respectively, each end cap being secured at the respective port by the respective attachment structure, and each end cap having at least one closed end to block access to the respective port.

2. The optical adapter of claim 1, wherein the internal structure includes an alignment sleeve disposed within the adapter body.

3. The optical adapter of claim 1, wherein the first attachment structure includes internal threading.

4. The optical adapter of claim 3, wherein the second attachment structure includes internal threading.

5. The optical adapter of claim 1, wherein the internal structure includes a latch arm.

6. The optical adapter of claim 1, wherein the first port is configured to receive an SC-type connector.

7. The optical adapter of claim 1, wherein the first port is configured to receive an LC-type connector.

8. The optical adapter of claim 1, wherein the first port is configured to receive a DLX-type connector.

9. The optical adapter of claim 1, wherein the first port is configured to receive an MPO-type connector.

10. The optical adapter of claim 1, wherein the first port has a first internal diameter and the second port has a second internal diameter.

11. The optical adapter of claim 1, wherein circumferential ribs extend radially outwardly from a surface of the body.

12. The optical adapter of claim 11, wherein the circumferential ribs are spaced apart from one another along the longitudinal axis of the body.

13. The optical adapter of claim 1, wherein the adapter body has an external surface devoid of threading.

14. The optical adapter of claim 1, wherein the adapter body has a generally cylindrical outer surface from which a plurality of circumferential ribs extend radially outwardly, the circumferential ribs having substantially the same outer diameter.

15. The optical adapter of claim 14, wherein the cylindrical outer surface is smooth adjacent the circumferential ribs.

16. The optical adapter of claim 1, wherein the adapter body has a generally cylindrical outer surface from which a plurality of circumferential ribs extend radially outwardly, wherein a first circumferential rib is located at a first axial end of the cylindrical outer surface, wherein the first circumferential rib extends radially outwardly no less than the other circumferential ribs, wherein a radial structure is located at a second axial end of the cylindrical outer surface, the radial structure extending radially outwardly no less than the cylindrical ribs.

17. The optical adapter of claim 1, further including a first tether securing the first end cap to the adapter body, and a second tether securing the second end cap to the adapter body.

18. A method of optically coupling first and second ruggedized optical connectors, the method comprising:

unthreading a first end cap from a first port of an optical adapter, the first end cap having at least one closed end to block access to the first port when threaded in the first port;

inserting the first ruggedized optical connector at the first port of the optical adapter, wherein the first ruggedized optical connector is environmentally sealed to the optical adapter;

rotating the first ruggedized optical connector to secure the first ruggedized optical connector at the first port;

unthreading a second end cap from a second port of the optical adapter, the second end cap having at least one closed end to block access to the second port when threaded in the second port;

inserting the second ruggedized optical connector at the second port of an optical adapter, wherein the second ruggedized optical connector is environmentally sealed to the optical adapter; and rotating the second ruggedized optical connector to secure the second ruggedized optical connector at the second port;

wherein the optical adapter includes internal structure that aligns an optical fibers of the first ruggedized optical connector with an optical fiber of the second ruggedized optical connector.

19. The method of claim 18, wherein rotating the first ruggedized optical connector includes threading the first ruggedized optical connector at the first port.

20. The method of claim 18, wherein rotating the second ruggedized optical connector includes threading the second ruggedized optical connector at the second port.

21. The method of claim 18, wherein the first port is configured to receive a DLX-type connector.

* * * * *